United States Patent
Koh et al.

(10) Patent No.: US 12,545,149 B2
(45) Date of Patent: Feb. 10, 2026

(54) VR-BASED SEAT CONTROL APPARATUS AND METHOD FOR VEHICLE

(71) Applicant: Hyundai Transys Inc., Seosan-si (KR)

(72) Inventors: Sang Kyung Koh, Yongin-si (KR); Ingyu Jang, Hwaseong-si (KR); Wonho Jung, Seongnam-si (KR); Seong Youn Jo, Seoul (KR)

(73) Assignee: Hyundai Transys Inc., Seosan-si (KR)

( * ) Notice: Subject to any disclaimer, the term of this patent is extended or adjusted under 35 U.S.C. 154(b) by 128 days.

(21) Appl. No.: 18/528,106

(22) Filed: Dec. 4, 2023

(65) Prior Publication Data
US 2024/0181938 A1 Jun. 6, 2024

(30) Foreign Application Priority Data
Dec. 6, 2022 (KR) .................. 10-2022-0168486

(51) Int. Cl.
*B60N 2/02* (2006.01)
*B60Q 9/00* (2006.01)

(52) U.S. Cl.
CPC ......... *B60N 2/0274* (2023.08); *B60N 2/0268* (2023.08); *B60Q 9/00* (2013.01)

(58) Field of Classification Search
CPC ...... B60N 2/0274; B60N 2/0241; B60Q 9/00; A63J 2005/002; A63J 5/00; G06F 3/011
See application file for complete search history.

(56) References Cited

U.S. PATENT DOCUMENTS

| | | | |
|---|---|---|---|
| 2014/0253588 A1* | 9/2014 | Mandala | G02B 27/017 345/633 |
| 2014/0267903 A1* | 9/2014 | Gairns | G03B 21/32 348/460 |
| 2017/0103571 A1 | 4/2017 | Beaurepaire | |
| 2018/0089900 A1* | 3/2018 | Rober | B60K 35/10 |
| 2020/0062240 A1 | 2/2020 | Marzorati et al. | |
| 2020/0282864 A1 | 9/2020 | Heidester | |
| 2023/0316773 A1* | 10/2023 | Avadhanam | G06V 20/56 382/104 |

FOREIGN PATENT DOCUMENTS

| | | |
|---|---|---|
| DE | 102009060213 A1 | 6/2011 |
| JP | 2000-293094 A | 10/2000 |
| JP | 2022-153738 A | 10/2022 |
| KR | 10-1917001 B1 | 11/2018 |
| KR | 10-2020-0032854 A | 3/2020 |
| KR | 10-2021-0022456 A | 3/2021 |

OTHER PUBLICATIONS

Falk Giemsa, "Extended European Search Report for EP Application No. 23214599.5", Apr. 30, 2024, EPO, Germany.

\* cited by examiner

*Primary Examiner* — Christian Chace
*Assistant Examiner* — Minato Lee Horner
(74) *Attorney, Agent, or Firm* — Bridgeway IP Law Group, PLLC; Jihun Kim

(57) ABSTRACT

A Virtual Reality (VR)-based seat control apparatus for a vehicle includes: an input unit for receiving an image mode operation command from a user; and a control unit for playing a prepared timetable according to the image mode operation command, performing interlocking with a seat module of a vehicle and VR equipment, and controlling an operation module of the seat module according to the timetable.

13 Claims, 5 Drawing Sheets

VR-BASED SEAT CONTROL APPARATUS AND METHOD FOR VEHICLE

CROSS-REFERENCE TO RELATED APPLICATIONS

This application claims priority to and the benefit of Korean Patent Application No. 10-2022-0168486 filed in the Korean Intellectual Property Office on Dec. 6, 2022, the entire contents of which are incorporated herein by reference.

TECHNICAL FIELD

The present invention relates to a Virtual Reality (VR)-based seat control apparatus and method for a vehicle.

BACKGROUND ART

In general, a simulation device is a device that implements and provides a user with a near-realistic situation. For example, a simulation device can provide a user with an amusement ride experience by simulating the vibration, tilt, and speed of a seat during a car race, or the vibration, tilt, and speed of an airplane during a fighter jet flight.

The simulation devices have been installed and operated on a limited basis in amusement parks and dedicated simulator theaters. Recently, the simulation devices have been miniaturized and sold to individuals for their own use.

On the other hand, implementing a simulation device requires several elements.

First, a Virtual Reality (VR) device that outputs virtual reality images of the situation is required. These VR images allow users to be immersed in virtual reality.

Second, motion bases that give the occupants a real-world experience in a staged situation are required. The movement of the motion bases gives the user the experience of being in a real vehicle or airplane.

Third, a control program for synchronizing the VR image and the motion base is required. In other words, the simulation device requires motion data in which various movements of the motion base are converted into data and are prepared in advance, and a control program that controls the motion base to move by using the motion data.

The configuration of the simulation device may include a seat for the user to sit on, a motorized cylinder to drive the seat to implement seat movement, a blower to implement various natural environments, and VR equipment to display VR images.

On the other hand, vehicles are nowadays equipped with various electronic devices as options. Vehicle seats are equipped with operational modules that work in conjunction with the various electronic devices. The operational modules may include seat-specific function modules, power seat modules, blower modules, heating lines, haptic modules, and sound modules.

When the various operating modules applied to the seats of the vehicles are used as a motion base, a simulation device that works in conjunction with VR equipment may be implemented.

In order to implement a simulation device through the interlocking between the operating modules of the vehicle seat with VR equipment, an integrated control environment must be implemented.

In addition, a communication environment that enables wireless communication with VR equipment must be implemented to transmit VR images.

However, existing vehicles do not have seat systems that allow for the implementation of VR-based simulation devices.

PRIOR ART LITERATURE

[Patent Document]
(Patent Document 1) Korean Patent Application Laid-Open No. 10-2020-0032854

SUMMARY OF THE INVENTION

The present invention has been made in an effort to provide a Virtual Reality (VR)-based seat control apparatus and method for a vehicle for realizing a VR-based simulation device by using an integrated control environment that controls an operation module mounted on a vehicle seat, and a communication environment that enables wireless communication with VR equipment.

An exemplary embodiment of the present invention provides a Virtual Reality (VR)-based seat control apparatus for a vehicle, the VR-based seat control apparatus including: an input unit for receiving an image mode operation command from a user; and a control unit for playing a prepared timetable according to the image mode operation command, performing interlocking with a seat module of a vehicle and VR equipment, and controlling an operation module of the seat module according to the timetable.

The VR-based seat control apparatus may further include: an output unit for outputting an operation notification sound to indicate an initiation of an image mode operation according to the image mode operation command; and a determination unit for determining a driving mode of the vehicle including whether the vehicle is stopped or travelling, based on the image mode operation command.

When the vehicle is in the travelling mode, the control unit may receive various vehicle information of the vehicle and predict a vehicle state including a normal state and a dangerous state by using the vehicle information.

The control unit may apply a result of the prediction of the state of the vehicle to the timetable.

When the vehicle is not in the travelling mode, the determination unit may determine whether to move a seat of the seat module to an initial position.

The determination unit may determine to move the seat of the seat module to the initial position when receiving information that a VR image is not playing or has finished playing from the VR equipment, and determine to maintain the seat of the seat module at a current position when receiving information of stopping playback of the VR image from the VR equipment.

When the control unit determines to move the operation module of the seat module to the initial position, the control unit may control the operation module to move the seat of the seat module to the initial position.

When the control unit determines to maintain the seat of the seat module in the current position, the control unit may check an interlocking status with the seat module after waiting for a predetermined time, calculate a start time of the interlocking, and play the timetable according to the start time of the interlocking.

Another exemplary embodiment of the present invention provides a Virtual Reality (VR)-based seat control method for a vehicle, the VR-based seat control method including: an input operation of receiving, by an input unit, an image mode operation command from a user; a timetable playback operation of playing, by a control unit, a prepared timetable according to the image mode operation command; and an interlocking operation of performing, by the control unit, interlocking with a seat module of a vehicle and VR equipment, and controlling an operation module of the seat module according to the timetable.

The VR-based seat control method may further include: an operation notification output operation of outputting, by an output unit, an operation notification sound to indicate an initiation of an image mode operation according to the image mode operation command; and a driving mode determination operation of determining, by a determination unit, a driving mode of the vehicle including whether the vehicle is stopped or travelling, based on the image mode operation command.

The VR-based seat control method may further include: an information receiving operation of receiving, when the vehicle is in the travelling mode, by the control unit, various vehicle information of the vehicle; and a vehicle state predicting operation of predicting, by the control unit, a vehicle state including a normal state and a dangerous state by using the vehicle information.

The VR-based seat control method may further include a timetable applying operation of applying, by the control unit, a result of the prediction of the state of the vehicle to the timetable.

The VR-based seat control method may further include a position movement determination operation of determining, by the determination unit, whether to move a seat of the seat module to an initial position when the driving mode of the vehicle is not the traveling mode, after the driving mode determination operation.

The position movement determination operation may include: determining, by the determination unit, to move the seat of the seat module to the initial position when the determination unit receives information that a VR image is not playing or has finished playing from the VR equipment; and determining, by the determination unit, to maintain the seat of the seat module at a current position when the determination unit receives information of stopping playback of the VR image from the VR equipment.

The VR-based seat control method may further include an initial position movement operation of moving, by the control unit, the seat of the seat module to the initial position by controlling the operation module of the seat module when the control unit determines to move the seat of the seat module to the initial position, after the position movement determination operation.

The VR-based seat control method may further include: after the position movement determination operation, a waiting operation of waiting for a predetermined time when the control unit determines to maintain the seat of the seat module in the current position; and an interlocking calculation operation of checking, by the control unit, a state of the interlocking with the seat module after the waiting for the predetermined time, and calculating a start time of the interlocking.

The VR-based seat control method may further include: after the interlocking operation, a playback completion operation of stopping, by the control unit, the interlocking with the seat module and the VR equipment when the playback of the timetable is completed; and a termination notification operation of outputting, by the output unit, a termination notification sound to indicate stopping of the interlocking when the interlocking with the seat module is stopped.

The VR-based seat control apparatus and method for the vehicle according to the exemplary embodiments of the present invention have the effect of enabling a VR-based simulation device to be implemented by using an integrated control environment that controls an operation module mounted on a vehicle seat, and a communication environment that enables wireless communication with VR equipment.

The VR-based seat control apparatus and method for the vehicle according to the exemplary embodiments of the present invention have the effect that it is possible to develop new entertainment or a Unique Selling Point (USP) in a vehicle.

The VR-based seat control apparatus and method for the vehicle according to the exemplary embodiments of the present invention have the effect in improving productivity of the vehicle.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

Figure 1:
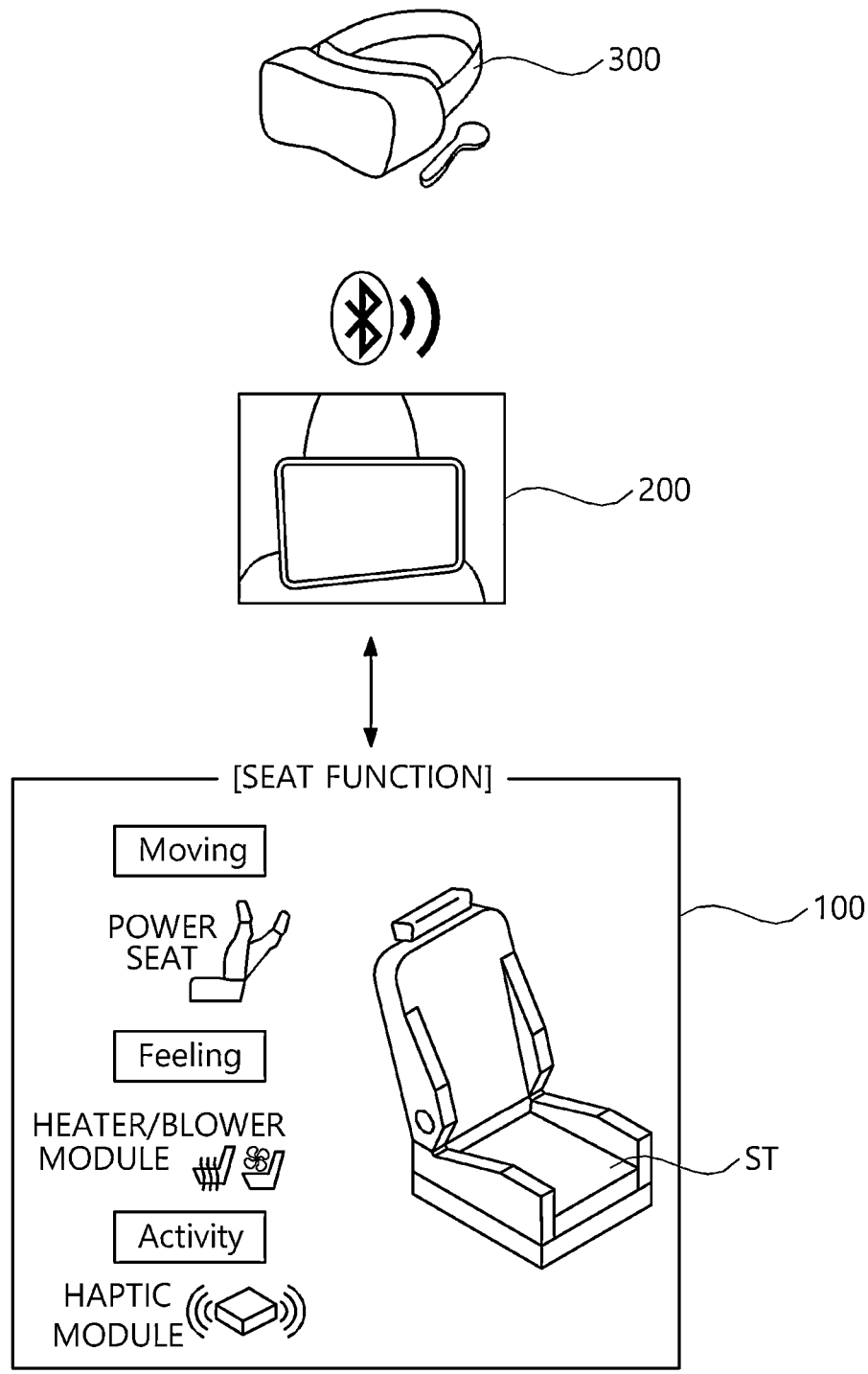
FIG. 1 is a conceptual diagram of a VR-based seat system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. It should be understood that although the exemplary embodiment of the present invention is described hereafter, the spirit of the present invention is not limited thereto and the present invention may be changed and modified in various ways by those skilled in the art.

FIG. 1 is a conceptual diagram of a VR-based seat system according to an exemplary embodiment of the present invention.

Figure 2:
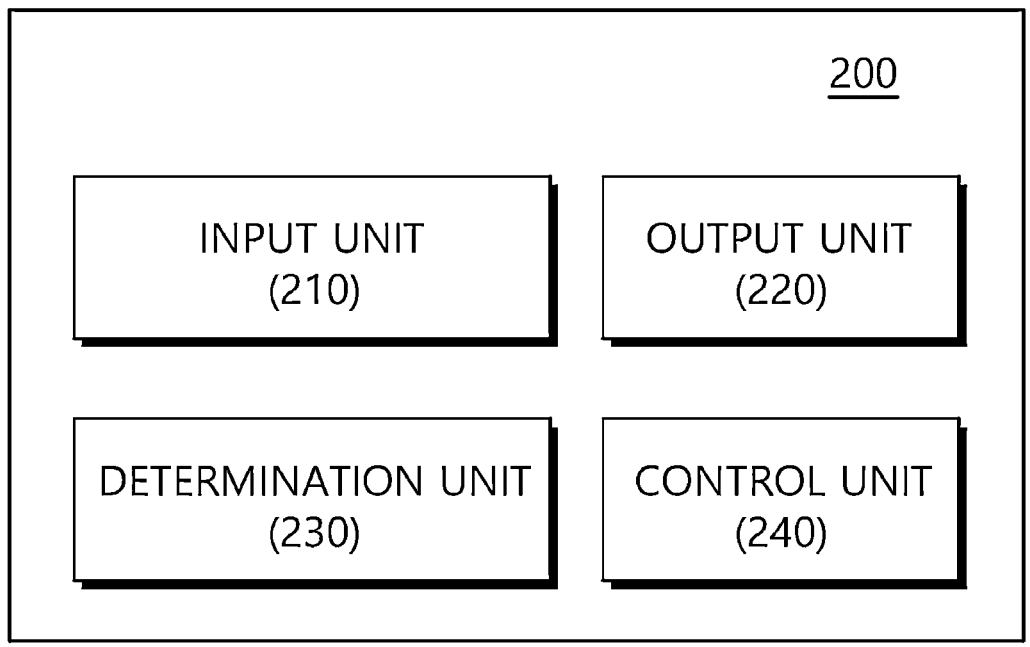
FIG. 2 is a block diagram of a VR-based seat control apparatus for a vehicle according to an exemplary embodiment of the present invention.

FIG. 2 is a block diagram of a VR-based seat control apparatus for a vehicle according to an exemplary embodiment of the present invention.

Referring to FIGS. 1 and 2, a VR-based seat system 10 according to an exemplary embodiment of the present invention is characterized in that a seat module 100, a seat control device 200, and a VR equipment 300 are used to provide virtual reality of a VR image to a user in three dimensions to enable the user to have a 4D experience in the vehicle.

The seat module 100 may include a seat ST that is mounted inside a vehicle, and an operational module that is mounted on the seat ST and performs various functions in communication with the seat control device 200. The operation modules may include a seat-specific function module, a power seat module, a blower module, a heating line (heater), a haptic module, and a sound module. Detailed configuration descriptions of the operation modules are omitted.

The seat control device 200 includes an input unit 210, an output unit 220, a determination unit 230, and a control unit 240. The seat control device 200 may be a kind of display device capable of outputting images and sounds and wirelessly communicating with the outside.

The input unit 210 may receive an image mode operation command from a user in connection with a VR image mode operation. The input unit 210 may include a touch screen, a switch, a keypad, and the like for receiving user commands.

The output unit 220 may output a notification sound to indicate the initiation of the image mode operation in response to the image mode operation command of the user. The output unit 220 may be a kind of speaker device. The output unit 220 may output a beep sound once in response to the image mode operation command of the user, but the type and number of times of the sound may be varied according to the user's needs.

The determination unit 230 may determine the driving mode of the vehicle, such as stopped or traveling, based on the image mode operation command of the user. The determination unit 230 may determine the driving mode of the vehicle based on an accelerator value or a brake value of the vehicle.

The determination unit 230 may determine whether to move the seat ST of the seat module 100 to the initial position when the vehicle is in a stopping state rather than a driving state.

In one exemplary embodiment, the determination unit 230 may receive playback information of the VR image through the communication with the VR equipment 300. The determination unit 230 may determine to move the seat ST of the seat module 100 to an initial position when the determination unit 230 receives information that the VR image is not playing or has finished playing. The determination unit 230 may determine to maintain the seat ST of the seat module 100 in the current position when the determination unit 230 receives information that the VR image has stopped playing. The control unit 240 may move the seat ST of the seat module 100 to the initial position or maintain the seat ST at the current position based on the determination result of the determination unit 230.

The control unit 240 may control the operation module of the seat module 100 in conjunction with the VR image of the VR equipment 300. The control unit 240 may generate a timetable for the interlocking with the VR image. In the timetable, a timeline of the VR image and a type of operation module of the seat module 100 to be interlocked with the VR image may be set.

The control unit 240 may control the operation modules of the seat module 100 according to the timeline of the timetable being played. The control unit 240 may include a main controller that controls movement of the power seat of the seat module 100. Further, the control unit 240 may include a first haptic controller that controls a front haptic module of the seat module 100 and a second haptic controller that controls a rear haptic module. In addition, the control unit 240 may include an environment controller that controls a heater and a blower module.

The control unit 240 may receive various vehicle information when the vehicle is driving, depending on the driving mode. The vehicle information may include information from the vehicle's front and rear cameras, suspension information, air conditioning signals, Global Positioning System (GPS) information, navigation information, and G-sensor information. The air conditioning signal may be the vehicle temperature information according to the interlocking of the heater and the blower module.

The control unit 240 may calculate the vehicle's rotational state, the vehicle's speed, and information about a road surface on which the vehicle is traveling by using the vehicle information. The information about the road surface may include pavement, unpaved roads, and bumps.

The control unit 240 may predict a vehicle state including a normal state or a dangerous state by using the rotational speed of the vehicle and the information about the road surface on which the vehicle travels. The control unit 240 may apply a result of the prediction of the vehicle state to a prepared timetable. The timetable may include the normal state and dangerous state information of the vehicle. In one exemplary embodiment, when the rotational speed of the vehicle is equal to or greater than a reference rotational speed, or when the road surface on which the vehicle travels corresponds to an unpaved road or a bump, the operation of the operation module of the seat module 100 may be stopped at a time corresponding to the dangerous state of the vehicle.

The control unit 240 may stop interlocking with the seat module 100 when the playback of the timetable is completed.

When the control unit 240 stops the interlocking with the seat module 100, the output unit 220 may output a termination notification sound to indicate the stopping of the interlocking. The termination notification sound may be a single beep sound, but the type and the number of times of the termination notification sound may be varied according to the needs of the user.

Figure 3:
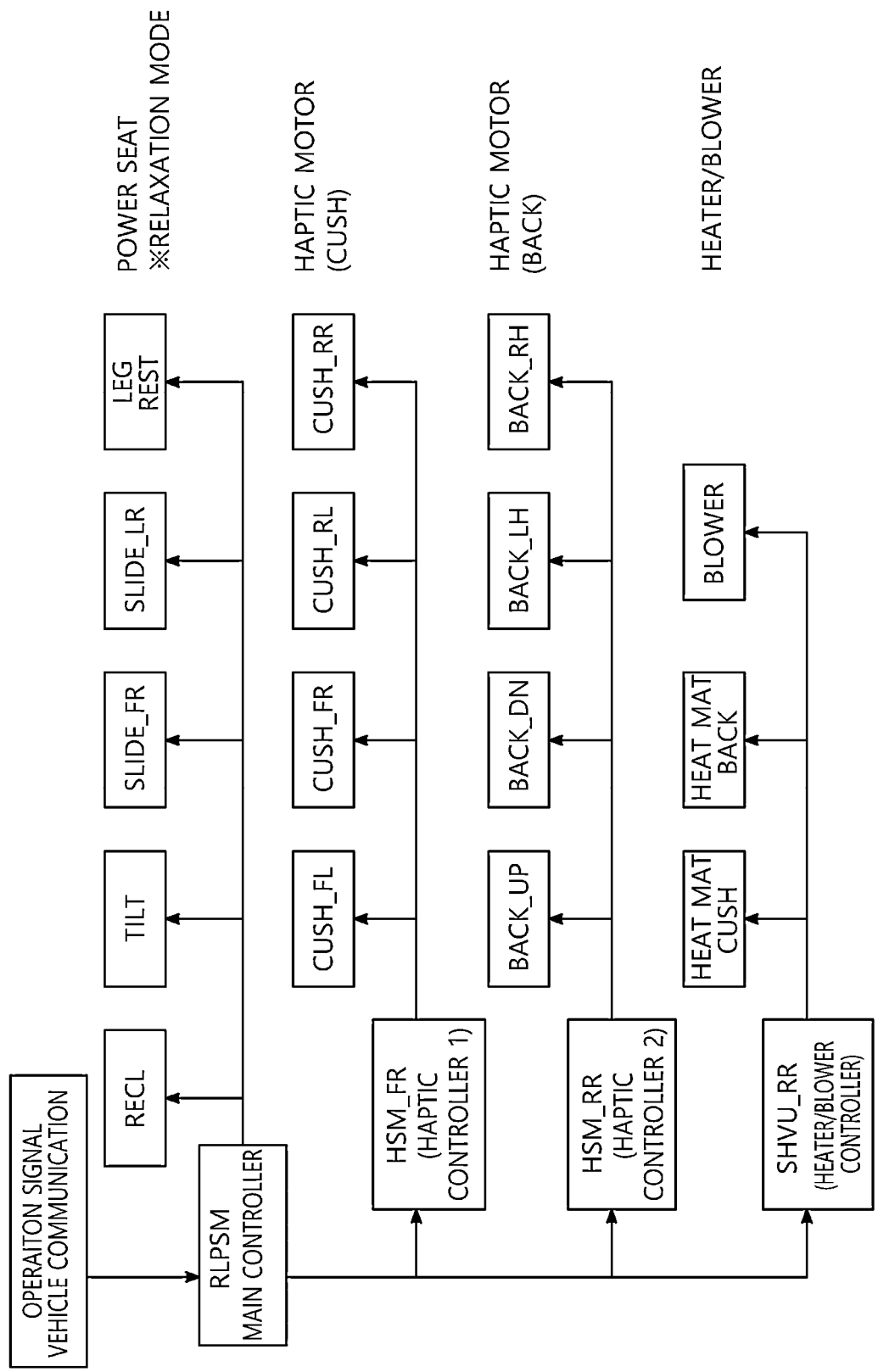
FIG. 3 is a diagram for illustrating an operation of an operation module of a seat module.

FIG. 3 is a diagram for illustrating an operation of an operation module of a seat module.

Referring to FIG. 3, the configuration of the control unit 240 for controlling the operation of the power seat module, haptic module, and heater/blower module of the seat module 100 may be checked.

A main controller may perform back recline (RECL), cushion tilt (TILT), cushion forward and backward slide (SLIDE_FR), cushion left and right slide (SLIDE_LR), and leg rest (LEG REST) control in the relaxation mode of the seat module 100.

The first haptic controller may control haptic motors mounted on the seat cushions CUSH to implement vibration. The haptic motors may be mounted on a cushion front left side CUSH_FL, a cushion front right side CUSH_FR, a cushion rear left side (CUSH_RL), and a cushion rear right side CUSH_RR.

The second haptic controller may control haptic motors mounted on the seat backs BACK to implement vibration. The haptic motors may be mounted on a back upper side BACK_UP, a back down side BACK_DN, a back left side BACK_LH, and a back right side BACK_RH.

The environment controller (heat/blower controller) may control a heater and a blower module BLOWER of the seat module 100 to provide heat and wind. The heater may include a heat mat for the cushion HEAT MAT CUSH that is mounted to the seat cushion CUSH and a heat mat for the back HEAT MAT BACK that is mounted to the seat back BACK. The blower module BLOWER may be mounted at any suitable position around the seat.

Figure 4:
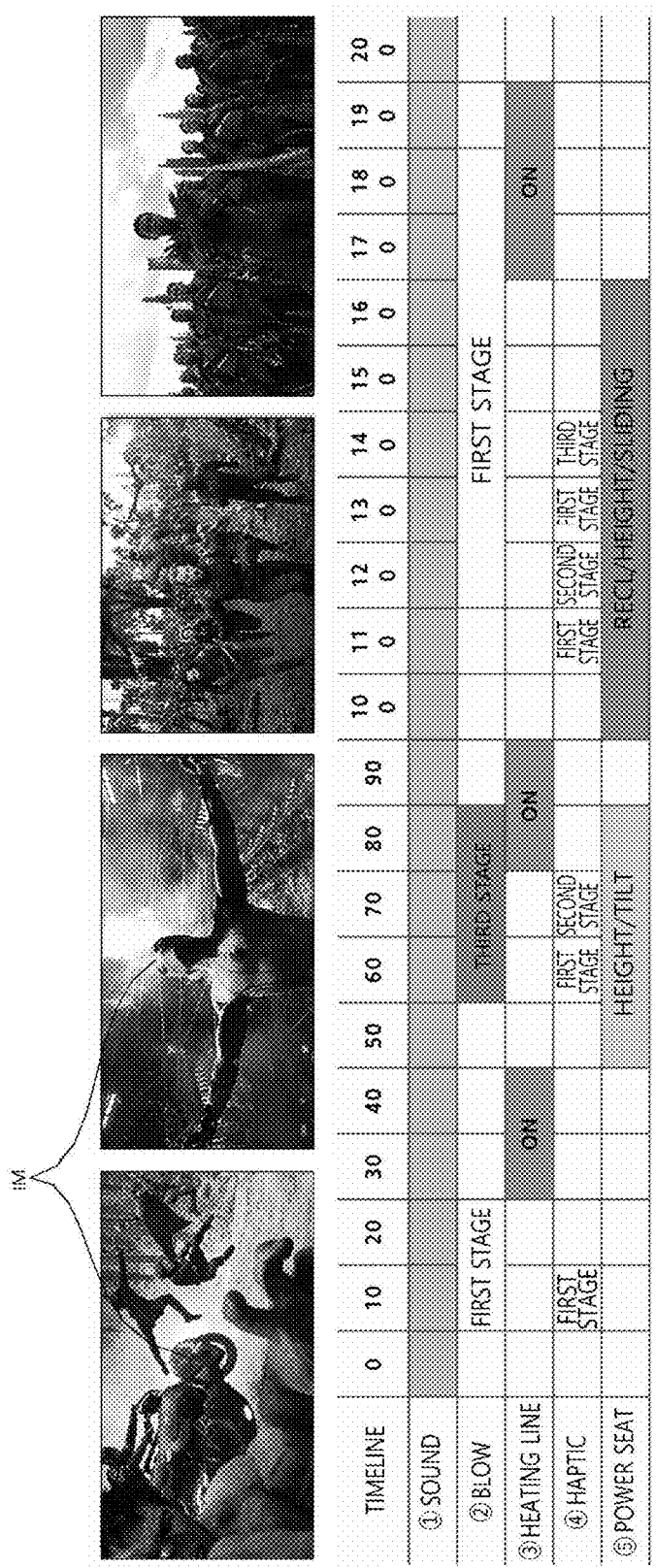
FIG. 4 is a diagram illustrating an example of a timetable.

FIG. 4 is a diagram illustrating an example of a timetable.

Referring to FIG. 4, various types of operation modules which are set to operate according to the timeline of the VR image IM may be checked. The timeline may be set to approximately one second, but is not limited thereto.

The sound module may be set to output an audio inserted into the VR image IM.

The blower module may be set at an appropriate timeline to operate in a windy situation in the VR image IM.

The heating line (heater) may be set at an appropriate timeline to operate in a situation where heat is generated in the VR image IM.

The haptic module may be set at an appropriate timeline to operate in a situation where vibration occurs in the VR image IM.

The power seat module may be set at an appropriate timeline to operate in a situation where various vehicle movements are happened in the VR image IM.

Figure 5:
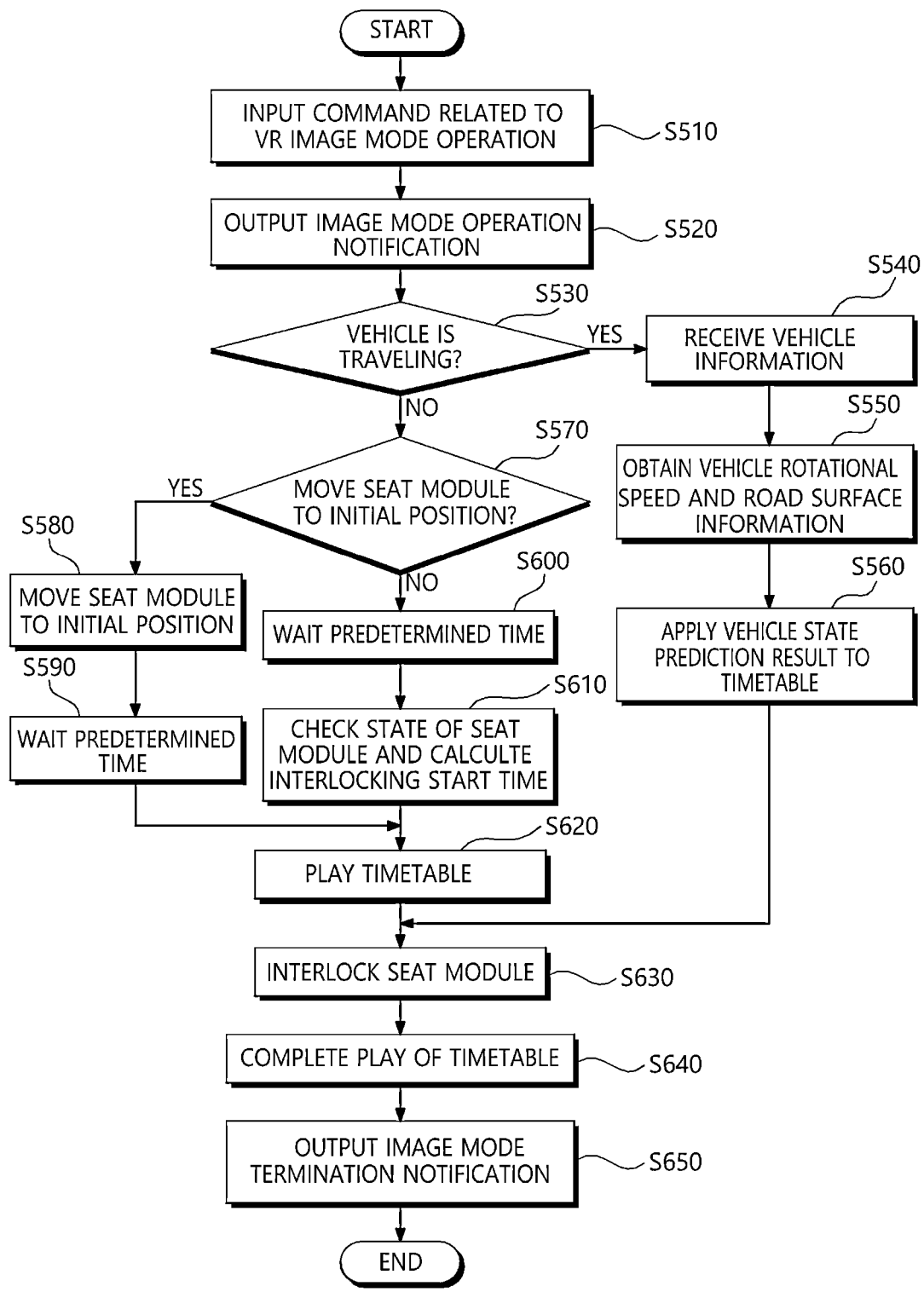
FIG. 5 is a flowchart of a VR-based seat control method for a vehicle according to an exemplary embodiment of the present invention.

FIG. 5 is a flowchart of a VR-based seat control method for a vehicle according to an exemplary embodiment of the present invention.

Referring to FIG. 5, a VR-based seat control method for a vehicle according to an exemplary embodiment of the present invention is characterized in that the seat module 100, the seat control device 200, and the VR equipment 300 are used to provide virtual reality of a VR image to a user in three dimensions to enable the user to have a 4D experience in the vehicle.

In an input operation S510, the input unit 210 may receive an image mode operation command from a user in relation to a VR image mode operation.

In an operation notification output operation S520, the output unit 220 may output an operation notification sound to indicate the initiation of the image mode operation according to the image mode operation command.

In a driving mode determination operation S530, the determination unit 230 may determine the driving mode of the vehicle, such as stopping or driving, according to the image mode operation command.

In an information receiving operation S540, the control unit 240 may receive various vehicle information when the vehicle is in a driving mode. The vehicle information may include information from the vehicle's front and rear cameras, suspension information, air conditioning signals, Global Positioning System (GPS) information, navigation information, and G-sensor information. The air conditioning signal may be the vehicle temperature information according to the interlocking of the heater and the blower module.

In a vehicle state prediction operation S550, the control unit 240 may calculate a rotational state of the vehicle, a vehicle speed, and information about a road surface on which the vehicle is traveling by using the vehicle information. The information about the road surface may include pavement, unpaved roads, and bumps. The control unit 240 may predict a vehicle state including a normal state or a dangerous state by using the rotational speed of the vehicle and the information about the road surface on which the vehicle travels.

In a timetable application operation S560, the control unit 240 may apply a result of the prediction of the vehicle state to a prepared timetable. The timetable may include the normal state and dangerous state information of the vehicle. The operation of the operation module of the seat module 100 may be stopped at a time corresponding to the dangerous state.

On the other hand, in a position movement determination operation S570 after the driving mode determination operation S530, the determination unit 230 may determine whether to move the seat ST of the seat module 100 to the initial position when the vehicle is not in the driving mode.

In one exemplary embodiment, the determination unit 230 may receive playback information of the VR image through the communication with the VR equipment 300. The determination unit 230 may determine to move the seat ST of the seat module 100 to an initial position when the determination unit 230 receives information that the VR image is not playing or has finished playing. The determination unit 230 may determine to maintain the seat ST of the seat module 100 in the current position when the determination unit 230 receives information that the VR image has stopped playing.

In an initial position movement operation S580, the control unit 240 may control the operation module of the seat module 100 to move the seat ST to the initial position when it is determined to move the seat ST of the seat module 100 to the initial position.

In a first waiting operation S590, the control unit 240 may wait a predetermined time after the movement of the position of the seat of the seat module 100. The output unit 220 may output a beeping notification sound approximately three times after the predetermined time of approximately three seconds has elapsed.

On the other hand, in a second waiting operation S600 after the position movement determination operation S570, the control unit 240 may wait for a predetermined time when it is determined to maintain the seat position of the seat module 100 at the current position. At this time, the output unit 220 may output the beeping notification sound approximately three times after the predetermined time of approximately three seconds has elapsed.

In an interlocking calculation operation S610, the control unit 240 may check the interlocking status with the seat module 100 after waiting for the predetermined time, and calculate an interlocking start time.

In a timetable playback operation S620 after the first waiting operation S590 or the interlock calculation operation S610, the control unit 240 may play the timetable according to the initial time or the calculated interlocking start time.

In the interlocking operation S630, the control unit 240 may perform interlocking with the seat module 100 and the VR equipment 300. The control unit 240 may control the operation module of the seat module 100 according to the timetable being played.

In a playback completion operation S640, the control unit 240 may stop the interlocking with the seat module 100 and the VR equipment 300 when the playback of the timetable is completed.

In a termination notification operation S650, when the output unit 220 stops the interlocking with the seat module 100, the output unit 220 may output a termination notification sound to indicate the termination of the interlocking. The termination notification sound may be a single beep sound, but the type and the number of times of the termination notification sound may be varied according to the needs of the user.

Although the exemplary embodiment of the present disclosure has been described for illustrative purposes, those skilled in the art will appreciate that various modifications, additions and substitutions are possible, without departing from the essential characteristic of the invention. Therefore, the exemplary embodiments disclosed in the present disclosure and the accompanying drawings are not intended to limit the technical spirit of the present disclosure, but are intended to illustrate the scope of the technical idea of the present disclosure, and the scope of the present disclosure is not limited by the exemplary embodiment and the accompanying drawings.

The operations and/or operations according to the present invention may occur in different orders, or in parallel, or simultaneously in different exemplary embodiments for different epochs and the like as may be appreciated by those skilled in the art.

Depending on the exemplary embodiment, a part or the entirety of the operations and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A Virtual Reality (VR)-based seat control apparatus for a vehicle, comprising:
    at least one processor configured to:
    receive, from a user, a command to operate an image mode;
    prepare a timetable of a VR image for the image mode, the timetable including a timeline of the VR image and a type of operation of a seat module of the vehicle to be synchronized with the VR image;
    run the timetable according to the command;
    perform synchronizing with the seat module of the vehicle and a VR equipment;
    control the seat module according to the timetable;
    determine a driving mode of the vehicle, the driving mode including a stopped mode or a travelling mode, according to the command;
    when the driving mode of the vehicle is determined to be the travelling mode, receive vehicle information of the vehicle, the vehicle information including a rotational speed of the vehicle and whether a road on which the vehicle travels includes an unpaved road or a bump, and predict a vehicle state to be a normal state or a dangerous state by using the vehicle information, the dangerous state being predicted when the rotational speed of the vehicle is equal to or greater than a reference rotational speed and when the road includes the unpaved road or the bump; and
    apply a result of prediction of the vehicle state to the timetable and stop operation of the seat module at a time corresponding to the dangerous state of the vehicle in the timetable.

2. The VR-based seat control apparatus of claim 1, wherein the at least one processor is further configured to:
    output an operation notification sound to indicate an initiation of the image mode according to the command.

3. The VR-based seat control apparatus of claim 1, wherein when the vehicle is not in the travelling mode, the at least one processor is configured to determine whether to move a seat of the seat module to an initial position.

4. The VR-based seat control apparatus of claim 3,
    wherein the at least one processor is configured to determine to move the seat of the seat module to the initial position when the at least one processor receives, from the VR equipment, information that a VR image has not been played or has finished playing, and
    wherein the at least one processor is configured to determine to maintain the seat of the seat module at a current position when the at least one processor receives, from the VR equipment, information of stopping playback of the VR image.

5. The VR-based seat control apparatus of claim 4, wherein when the at least one processor determines to move the seat of the seat module to the initial position, the at least one processor is configured to control the seat module to move the seat of the seat module to the initial position.

6. The VR-based seat control apparatus of claim 4, wherein when the at least one processor determines to maintain the seat of the seat module in the current position, the at least one processor is configured to check a synchronizing status with the seat module after waiting for a predetermined time, calculate a start time of the synchronizing, and run the timetable according to the start time of the synchronizing.

7. A Virtual Reality (VR)-based seat control method for a vehicle, comprising:
    receiving, by a seat control device having a display, a command to operate an image mode from a user;
    preparing a timetable of a VR image for the image mode, the timetable including a timeline of the VR image and a type of operation of a seat module of the vehicle to be synchronized with the VR image;
    running, by a controller of the seat control device, the timetable according to the command; and
    synchronizing, by the controller, with the seat module of the vehicle and a VR equipment, and controlling the seat module according to the timetable,
    determining, by the seat control device, a driving mode of the vehicle, the driving mode including a stopped mode or a travelling mode, according to the command,
    receiving, when the vehicle is in the travelling mode, by the controller, vehicle information of the vehicle, the vehicle information including a rotational speed of the vehicle and whether a road on which the vehicle travels includes an unpaved road or a bump; and
    predicting, by the controller, a vehicle state including a normal state and a dangerous state based on the vehicle information, the dangerous state being predicted when the rotational speed of the vehicle is equal to or greater than a reference rotational speed and when the road includes the unpaved road or the bump; and applying, by the controller, a result of prediction of the vehicle state to the timetable, and when the dangerous state is predicted, stopping operation of the seat module at a time corresponding to the dangerous state of the vehicle in the timetable.

8. The VR-based seat control method of claim 7, further comprising:

outputting, by a speaker of the seat control device, an operation notification sound to indicate an initiation of the image mode according to the command.

9. The VR-based seat control method of claim 8, further comprising:

determining, by the seat control device, whether to move a seat of the seat module to an initial position or maintain the seat of the seat module at a current position when the driving mode of the vehicle is not a traveling mode, after the driving mode of the vehicle is determined.

10. The VR-based seat control method of claim 9, wherein the determining of whether to move a seat of the seat module to an initial position or maintain the seat of the seat module at a current position includes:

determining, by the seat control device, to move the seat of the seat module to the initial position when the seat control device receives, from the VR equipment, information that a VR image has not been played or has finished playing; and determining, by the seat control device, to maintain the seat of the seat module at the current position when the seat control device receives, from the VR equipment, information of stopping playback of the VR image.

11. The VR-based seat control method of claim 10, further comprising:

moving, by the controller, the seat of the seat module to the initial position by controlling the seat module when the controller determines to move the seat of the seat module to the initial position, after the determining of whether to move the seat of the seat module to the initial position or maintain the seat of the seat module at the current position.

12. The VR-based seat control method of claim 10, further comprising:

after the determining of whether to move the seat of the seat module to the initial position or maintain the seat of the seat module at the current position, waiting for a predetermined time when the controller determines to maintain the seat of the seat module in the current position; and checking, by the controller, a state of the synchronizing with the seat module after the waiting for the predetermined time, and calculating a start time of the synchronizing.

13. The VR-based seat control method of claim 12, further comprising:

after the synchronizing, stopping, by the controller, the synchronizing with the seat module and the VR equipment when the running of the timetable is completed; and outputting, by the speaker, a termination notification sound to indicate stopping of the synchronizing when the synchronizing with the seat module is stopped.

* * * * *